(12) United States Patent
Dumler et al.

(10) Patent No.: US 12,692,900 B2
(45) Date of Patent: Jul. 28, 2026

(54) ROLLING ELEMENT CAGE AND DISPLACEMENT UNIT

(71) Applicant: Neumayer Tekfor Engineering GMBH, Hausach (DE)

(72) Inventors: Arthur Dumler, Villingen-Schwenningen (DE); Martin Lehmann, Hornberg (DE)

(73) Assignee: NEUMAYER TEKFOR ENGINEERING GMBH, Hausach (DE)

( * ) Notice: Subject to any disclaimer, the term of this patent is extended or adjusted under 35 U.S.C. 154(b) by 147 days.

(21) Appl. No.: 18/647,848

(22) Filed: Apr. 26, 2024

(65) Prior Publication Data

US 2024/0360871 A1     Oct. 31, 2024

(51) Int. Cl.
| | |
|---|---|
| *F16C 29/06* | (2006.01) |
| *F16C 29/00* | (2006.01) |
| *F16C 29/04* | (2006.01) |
| *F16C 33/38* | (2006.01) |
| *F16D 3/06* | (2006.01) |

(52) U.S. Cl.
CPC ............ *F16C 29/04* (2013.01); *F16C 29/005* (2013.01); *F16C 29/068* (2013.01); *F16C 33/38* (2013.01); *F16D 3/065* (2013.01)

(58) Field of Classification Search
CPC .............................. F16C 29/068; F16D 3/065
USPC ............................................. 464/167; 384/51
See application file for complete search history.

(56) References Cited

U.S. PATENT DOCUMENTS

| | | | |
|---|---|---|---|
| 2,255,626 A | 9/1941 | Ortegren et al. | |
| 4,648,727 A | 3/1987 | O'Neil et al. | |
| 2010/0004065 A1* | 1/2010 | Lehmann ................ | F16D 3/065 464/167 |
| 2014/0307988 A1* | 10/2014 | Chen ................... | F16C 33/3825 384/10 |
| 2016/0131196 A1* | 5/2016 | Miyawaki ............... | F16C 29/04 464/167 |
| 2020/0189647 A1* | 6/2020 | Schmidt ................... | B62D 1/20 |

FOREIGN PATENT DOCUMENTS

| | | |
|---|---|---|
| DE | 10123221 | 1/2008 |
| DE | 10 2018 120 628 | 2/2020 |
| DE | 11 2013 001 578 | 9/2021 |
| DE | 10 2010 010 487 | 1/2022 |
| EP | 2 281 123 | 2/2011 |

(Continued)

*Primary Examiner* — John Olszewski
*Assistant Examiner* — Aimee Tran Nguyen
(74) *Attorney, Agent, or Firm* — Dickinson Wright PLLC

(57)     ABSTRACT

A displacement unit includes a pin, a sleeve, a plurality of rolling elements, and a rolling element cage. The pin includes a plurality of external raceways. The sleeve includes a plurality of internal raceways. The sleeve is configured to receive at least a portion of the pin. The rolling element cage includes a plurality of openings configured to each accommodate a rolling element of the plurality of rolling elements. The rolling element cage is configured to be received around the pin and disposed radially between the pin and the sleeve. The plurality of rolling elements are configured to be received at least partially within (i) the plurality of external raceways of the pin and (ii) the plurality of internal raceways of the sleeve.

20 Claims, 5 Drawing Sheets

(56)         References Cited

FOREIGN PATENT DOCUMENTS

GB          0 629 766          3/1950
GB          2 345 096          6/2000
JP          2019-157936          9/2019
WO          WO-2009/138070          11/2009

* cited by examiner

1

ROLLING ELEMENT CAGE AND DISPLACEMENT UNIT

CROSS-REFERENCE TO RELATED PATENT APPLICATIONS

The present application claims the benefit of and priority to German Patent Application No. DE 10 2023 001 741.8, filed Apr. 29, 2023, which is incorporated herein by reference in its entirety.

BACKGROUND

The present application relates to a rolling element cage for a displacement unit for use in vehicles.

During operation of a vehicle, one or more components of a drivetrain of the vehicle may longitudinally shift as a result of driving over bumps, turning, braking, or another operation. Varying the longitudinal distance between these axially connected components during operation of the vehicle may ensure proper alignment, engagement, and power transfer therebetween. Displacement units are used in vehicle powertrains to provide longitudinal compensation between a transmission (e.g., a gearbox) and a chassis of a vehicle.

SUMMARY

One embodiment relates to a displacement unit for a vehicle. The displacement unit includes a pin, a sleeve, a plurality of rolling elements, and a rolling element cage. The pin includes a plurality of external raceways. The sleeve includes a plurality of internal raceways. The sleeve is configured to receive at least a portion of the pin. The rolling element cage includes a plurality of openings configured to each accommodate a rolling element of the plurality of rolling elements. The rolling element cage is configured to be received around the pin and disposed radially between the pin and the sleeve. The plurality of rolling elements are configured to be received at least partially within (i) the plurality of external raceways of the pin and (ii) the plurality of internal raceways of the sleeve.

Another embodiments relates to a rolling element cage for a displacement unit. The rolling element cage includes a plurality of openings, a longitudinal axis, and a guide structure. The plurality of openings are arranged in a row along the longitudinal axis. The guide structure is positioned along an outer surface of the rolling element cage and laterally flanks two adjacent openings in the row.

Another embodiments relates to a displacement unit for a vehicle. The displacement unit includes a pin, a sleeve, a plurality of rolling elements, and a rolling element cage. The pin includes a plurality of external raceways. The sleeve includes a plurality of internal raceways and is configured to receive at least a portion of the pin. The rolling element cage includes a plurality of openings configured to each accommodate a rolling element of the plurality of rolling elements. the rolling element cage is configured to be received around the pin and disposed radially between the pin and the sleeve. The plurality of rolling elements are configured to be received at least partially within (i) the plurality of external raceways of the pin and (ii) the plurality of internal raceways of the sleeve. The pin and the sleeve each include an end area where the plurality of external raceways and the plurality of internal raceways terminate, respectfully, the end area including a ramp and a plateau. An outermost rolling element of the plurality of rolling elements is configured to engage the ramp when the displacement unit is in a compressed state. The plateau provides a space for an end face of the rolling element cage, such that, when the displacement unit is in the compressed state, the end face of the rolling element cage does not contact the pin or the sleeve and an axial force is transferred between the pin and the sleeve via the plurality of rolling elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
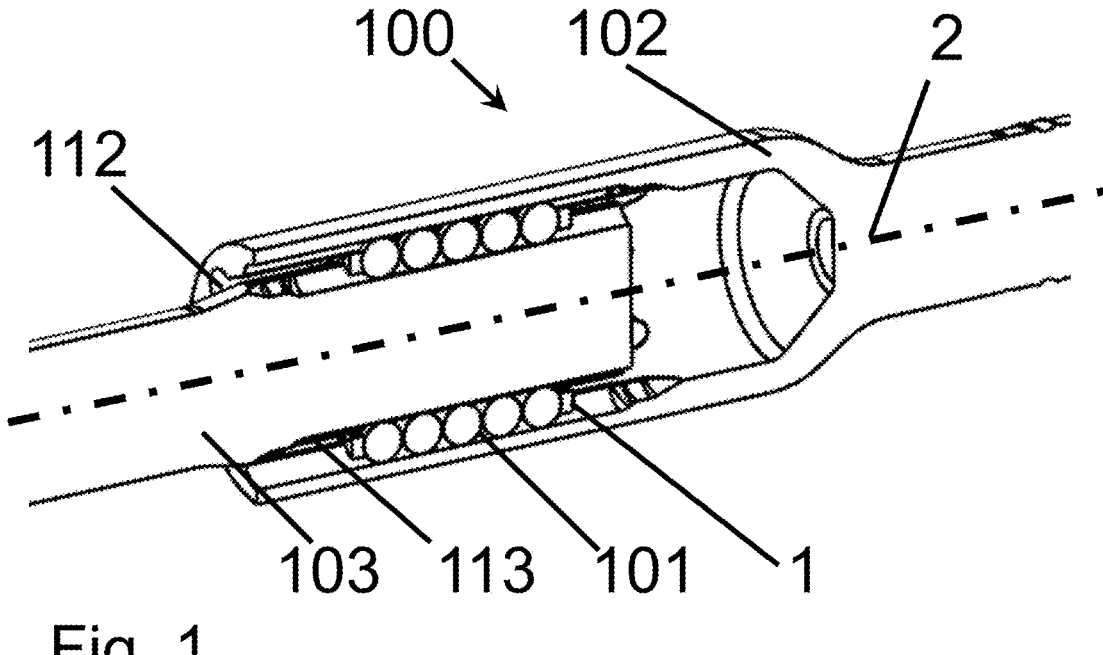
FIG. 1 is a cross-sectional perspective view of a displacement unit, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Displacement units (e.g., a roller balancing unit, etc.) are used, for example, in vehicle powertrains to provide longitudinal compensation. In some embodiments, the displacement units are used to provide longitudinal compensation between a transmission (e.g., a gearbox) and a chassis of the vehicle. According to an exemplary embodiment, a displacement unit includes a sleeve (e.g., a profiled sleeve) and a pin (e.g., a pin having journals, a profile journal, etc.). The pin may be mounted in (e.g., at least partially received within) the sleeve via rolling elements (e.g., the rolling element cage). The rolling elements, which include one or more balls, spherical elements, etc., are held in a cage (e.g., the rolling element cage). The cage includes one or more openings (e.g., windows, apertures, etc.), each configured to receive (e.g., hold, support, etc.) at least one rolling element. The openings of the cage are arranged along a longitudinal axis of the cage. By way of example, the openings may be arranged radially along an outer circumference of the cage in rows that extend substantially parallel to the longitudinal axis of the cage. This basic structure is described, for example, in WO 2009/138070 A1.

Traditionally, rolling element or ball cages are made of plastic or another synthetic material. The design is such that between openings, which are adjacent to each other in a row, there is a ridge formed from an accumulation of material. This ridge is used to implement a clip function. During assembly, balls can be clipped in and held securely in a form-fitting manner. The clips are designed in such a way that they deform elastically in an axial direction when the balls are pressed in. In order to enable the axial formability of the clips, it is necessary to leave a certain distance between two adjacent balls during the traditional manufacturing processes (e.g., tool-based manufacturing processes such as plastic injection molding). The minimum distance between two adjacent balls typically corresponds to the radius of the balls used. The clips thus limit the ball packing density and thus also limit the power density of the displacement unit or the roller compensation in relation to the installation space.

The goal of the present disclosure is therefore to propose a rolling element cage that facilitates a displacement unit having an increased power density compared to that of traditional systems.

The present disclosure solves the problem by means of a rolling element cage for a displacement unit. The rolling element cage includes a longitudinal axis, a plurality of openings, an outer surface, and at least one guide structure (e.g., support, etc.). The openings are configured to accommodate one rolling element each and to be arranged in at least one row along the longitudinal axis of the rolling element cage. The guide structure is positioned along the outer surface of the rolling element cage and flanks (e.g., is positioned along one or more sides of, is positioned along opposing lateral sides of, etc.) two adjacent openings in the row.

The rolling element cage (e.g., simply referred to as a cage) may be suitable for use in a displacement unit. In such an embodiment, the rolling element cage includes a longitudinal axis, a plurality of openings, an outer surface, and at least one guide structure. The cage is preferably designed as a hollow cylinder with a generally circular base (e.g., profile, area, etc.). The openings in the cage permit the rolling elements (e.g., balls) to be inserted therein during assembly (e.g., production) and are configured to hold the rolling elements such that they can still rotate (e.g., rotate within the openings). The openings form at least one row (e.g., are arranged in at least one row) along the longitudinal axis of the cage. In this manner, there are several rolling elements adjacent to each other (e.g., within the at least one row) in the displacement unit. The at least one guide structure is configured to hold the rolling elements. The guide structure is located to laterally flank two windows that are adjacent to each other in a row. Therefore, rather than a ridge for holding rolling elements that is located within the row between two openings, the guide structure of the present disclosure is positioned laterally along the row of openings (e.g., a pair of guide structures oppose each other in a circumferential direction across the row of openings, the guide structure is positioned circumferentially offset from the row of openings and axially flank two openings, etc.). In this manner, the guide structure is not positioned within the row of the rolling elements to limit axial movement of the rolling elements, but are rather positioned to hold the rolling elements from the lateral side (e.g., from opposing lateral sides of the rolling elements to limit lateral and circumferential movement thereof). This makes it possible to position the openings closer to each other and thus position the rolling elements closer together. In some embodiments, the guide structures holding the rolling elements do not space the rolling elements apart from each other in the axial direction. In such embodiments, depending on the positioning of the openings along the row (e.g., based on the axial spacing between the openings), the rolling elements can directly contact each other. The spacing between the openings and the rolling elements advantageously reduces the installation space needed to accommodate the same number of rolling elements, or to accommodate more rolling elements in the same installation space. As a result, the power density of the roller compensation can be increased or costs (e.g., associated with manufacturing) can be reduced while maintaining the same function and performance. By way of example, the (i) spacing between the openings and the rolling elements and (ii) the arrangement of the guide structures facilitates production of a smaller (e.g., less material used) and therefore less expensive rolling element cage. Another advantage of the spacing between the openings and the rolling elements is that axial forces may be transmitted via the rolling elements (e.g., in addition to or as an alternative to the axial forces being transmitted via the body of the rolling element cage) arranged in a row (e.g., in series) during the assembly of the displacement unit and during operation of the displacement unit (e.g., in vehicle powertrains to provide longitudinal compensation between a transmission and a chassis of the vehicle).

The rolling element cage includes an inner surface and at least one support structure (e.g., a counter structure) located on the inner side and along the longitudinal axis between two openings adjacent to each other in the row of openings. In this manner, the rolling elements received within the openings are held in place by the guide structure along the outer surface of the cage and by the support structure along the inner surface of the cage. By way of example, when the rolling elements are received within the openings, they are supported such that (i) a first portion of the rolling elements extends within the cage (e.g., radially inward relative to the inner surface) and is supported by the support structure, and (ii) a second portion of the rolling elements extends exterior to the cage (e.g., radially outward relative to the outer surface) and is supported by the guide structure. The support structures are located along the row between the openings. The support structures are structured and arranged such that they do not protrude into a plane of rotation within which the rolling elements rotate (e.g., the support structures are not arranged between the rolling elements). In other words, the support structure does not prevent the rolling elements received within the openings from contacting each other (e.g., if the openings are positioned sufficiently close together).

In some embodiments, the support structures are positioned and structured to (i) space a first portion of two rolling elements from each other to facilitate holding the rolling elements, and (ii) permit direct contact between a second portion of the rolling elements. In such embodiments, the first portion and the second portion of a particular rolling element are on the same side of the rolling element (e.g., the same axial half of the rolling element). In some embodiments, the support structures structured such that they are positioned below a center (e.g., a center point, a centroid, etc.) of the rolling elements. The support structures may be chamfered, such that at least a portion of the support structures protrudes from the inside of the cage (e.g., a radially interior space) into an axial area between two rolling elements, but do not axially space the rolling elements from each other (e.g., do not limit contact between adjacent rolling elements.

In some embodiments, the rolling element cage includes a plurality of guide structures. The guide structures are located to laterally flank two adjacent openings in the row. The guide structures are spaced to form a gap between two adjacent guide structures. The gap formed between the guide structures may be at the height of a corresponding opening-preferably at the level of the middle of the opening (e.g., at a substantially similar radial distance relative to the opening). In this manner, two adjacent openings in each row are flanked by a guide structure, and the gap between the adjacent guide structures is located along the longitudinal axis at the level of a corresponding opening. In other words, several guide structures are provided along sides of the row of openings, which cooperate with each other to form a side wall with recesses on the side of the row of openings. In some embodiments, the guide structures are located on both sides of the row of openings (e.g., along opposing lateral or circumferential sides of the row of openings) and extend in an axial direction along the row of openings. The gaps (e.g., recesses) are located at the radial level (e.g., the radial distance from the longitudinal axis) of the openings of the cage or at the radial level of the area in which the center of the rolling element is located (e.g., when the rolling element is received within the opening). In some embodiments, the gap is at the radial level of the middle of the opening (e.g., the area where the rolling element is positioned when received within the opening).

The rolling element cage includes openings arranged in a plurality of rows and guide structures along each row. The rows of openings are circumferentially spaced apart from each other along the circumference of the rolling element cage. In some embodiments, the rows are equally spaced apart about the circumference of the rolling element cage. The components and features of the rolling element cage described above with respect to a single row of openings can similarly be applied to each row of the plurality of rows of openings.

According to an exemplary embodiment, the displacement unit includes a sleeve, a pin, a rolling element cage, and a plurality of rolling elements. The sleeve includes a plurality of internal raceways (e.g., raceways along an internal surface thereof). The pin includes a plurality of external raceways (e.g., raceways along an external surface thereof). As discussed above, the rolling element cage includes a plurality of openings. The rolling elements are configured to be arranged in the openings of the rolling element cage. The rolling element cage is configured to be disposed between the sleeve and the pin. The rolling elements are configured to be arranged, at least partially, in the internal raceways of the sleeve and the external raceways of the pin. The rolling element cage may be configured as the rolling element cage described in greater detail herein.

Accordingly, the present disclosure also relates to a displacement unit with a rolling element cage configured in accordance with one of the preceding or following configurations. The configurations and descriptions relating to the rolling element cage also apply accordingly to the displacement unit with this cage.

According to an exemplary embodiment, an end area of the internal raceways of the sleeve and/or an end area of the external raceways of the pin includes a ramp (e.g., a shoulder, a transition portion, etc.) and a plateau (e.g., a flat portion) adjacent to the ramp. The ramp may define a slope (e.g., a gradient). In some embodiments, when the sleeve and the pin are in a first state (e.g., a minimum displacement state, a state in which the pin is in a fully received position relative to the sleeve, etc.) or a second state (e.g., a maximum displacement state, a state in which the pin and sleeve are fully extended relative to each other, etc.), a rolling element within an end opening (e.g., an opening proximate an end base portion) of the rolling element cage facing the end area (e.g., the end area of the internal raceways, the end area of the external raceways, etc.) contacts the ramp. The plateau may extend in an axial direction such that when the sleeve and the pin are in the first state, an end base portion of the rolling element cage (e.g., a section of the rolling element cage following the end opening) facing the end area does not (e.g., is free of) contact the sleeve and/or the pin.

The present disclose provides for various advantages, including if the pin and sleeve are pushed together to the first state (or pulled apart to the second state), the frictional connection between the rolling elements and the sleeve and/or pin is transferred from one rolling element to the next, instead of being transferred to a wall of the rolling element cage and then to the rolling elements. With high axial forces, the cage may plastically deform, be damaged, or fail entirely if the axial forces are transferred to a wall of the rolling element cage and then to the rolling elements (e.g., if the cage is made of plastic). The structure of the displacement unit and the rolling element cage facilitate a flow of force directly from one rolling element to the next rolling element without the axial forces being exerted on the rolling element cage. High axial forces can occur both during component assembly and during operation. For example, axial forces may be experienced by the rolling elements if at least one side of the rolling elements are in contact with the end of the raceway (e.g., the end of the internal and/or external raceways proximate the ramp and plateau) and can no longer roll further along (e.g., relative to) the raceway. In other words, the end areas of the raceways are shaped to limit movement of the rolling elements thereto and to prevent contact between (i) the end of the rolling element cage and (ii) (a) the sleeve or (b) the pin. The raceway end areas include a ramp with which the outermost rolling element (e.g., the rolling elements closest to the ends of the rolling element cage, the rolling elements with only one adjacent rolling element, etc.) is configured to contact to limit axial movement of the sleeve and the pin relative to each other. To prevent the rolling element cage from contacting the sleeve or the pin, the ramp is followed by a plateau. The plateau, in the case of the pin, defines a larger radius compared to that of the other sections of the external raceways, and in the case of the sleeve, defines a smaller radius compared to that of the other sections of the internal raceways. In such an embodiment, the end area of the rolling element cage can be positioned radially outward relative to the plateau of the pin and/or radially inward relative to the plateau of the sleeve. The rolling element cage may provide guidance (e.g., hold) the rolling elements in a form-fitting manner such that there is substantially no flow of force therethrough (e.g., axial forces due to engagement of the rolling elements with the ramps). Accordingly, ramp is shaped such that the end rolling element is configured to engage therewith. The plateau is suitably shaped (e.g., an axial length and a radius (e.g., radial extension) thereof) such that the end base of the rolling element cage is configured to (i) be disposed between the sleeve and the pin and (ii) not engage with the sleeve or the pin when the end rolling element is engaged with the ramp. Similarly, a height and a length of this end area of the rolling element cage is suitably dimensioned to (i) be disposed between the sleeve and the pin and (ii) not engage with the sleeve or the pin when the end rolling element is engaged with the ramp.

FIG. 1 shows a displacement unit 100 including a sleeve 102 and a pin 103 configured to translate relative to each other. The sleeve 102 defines an interior chamber configured to receive at least a portion of the pin 103 and permit translation of the pin 103 relative to the sleeve 102. The displacement unit 100 includes one or more rolling elements 101 configured to facilitate translation of the sleeve 102 and the pin 103 relative to each other. According to an exemplary embodiment, the rolling elements 101 are balls (e.g., spherical elements). The rolling elements 101 are configured to move (e.g., rotate, translate, etc.) within internal raceways 112 (e.g., guides, tracks, journals, etc.) of the sleeve 102 (e.g., raceways along an internal surface thereof, raceways along a radially inward facing surface thereof, etc.) and external raceways 113 (e.g., guides, tracks, journals, etc.) of the pin 103 (e.g., raceways along an external surface thereof, raceways along a radially outward facing surface thereof, etc.).

The rolling elements 101 are guided and supported by a rolling element cage 1 (e.g., a ball cage). The rolling element cage 1 defines an axis, shown as longitudinal axis 2. The rolling element cage 1 is configured to slidably couple with the pin 103 (e.g., the pin 103 is received within an internal cavity of the rolling element cage 1 and translatable relative to the rolling element cage 1) such that a longitudinal axis of the pin 103 is coaxial with the longitudinal axis 2 of the rolling element cage 1. When the pin 103 and the sleeve 102 are translated relative to together to a first state (e.g., pushed together to a compressed state), a force (e.g., an axial force) between the sleeve 102 and the pin 103 is transmitted therebetween by the rolling elements 101. By way of example, an axial force on the pin 103 is transmitted via the rolling elements 101 directly to the sleeve 102. A particular rolling element 101 is configured to contact (e.g., engage, touch, etc.) one or more adjacent rolling elements 101 directly (e.g., one or more neighboring rolling elements 101 in a row along the longitudinal axis 2 and supported by the rolling element cage 1). The rolling elements 101 positioned proximate an end base portion, shown as end face 8, of the rolling element cage 1 (e.g., the outermost rolling elements 101 of each row, the rolling elements 101 closest to the end face 8 of the rolling element cage 1, etc.) is configured to directly contact the sleeve 102 (e.g., as a result of the structured of the internal raceways 112 of the sleeve 102). The sleeve 102 and the pin 103 are structured such that the end face 8 of the rolling element cage 1, which follows the outermost rolling elements 101, does not engage with (e.g., contact, bump into, etc.) one or both of the sleeve 102 and the pin 103.

Figures 2, 3:
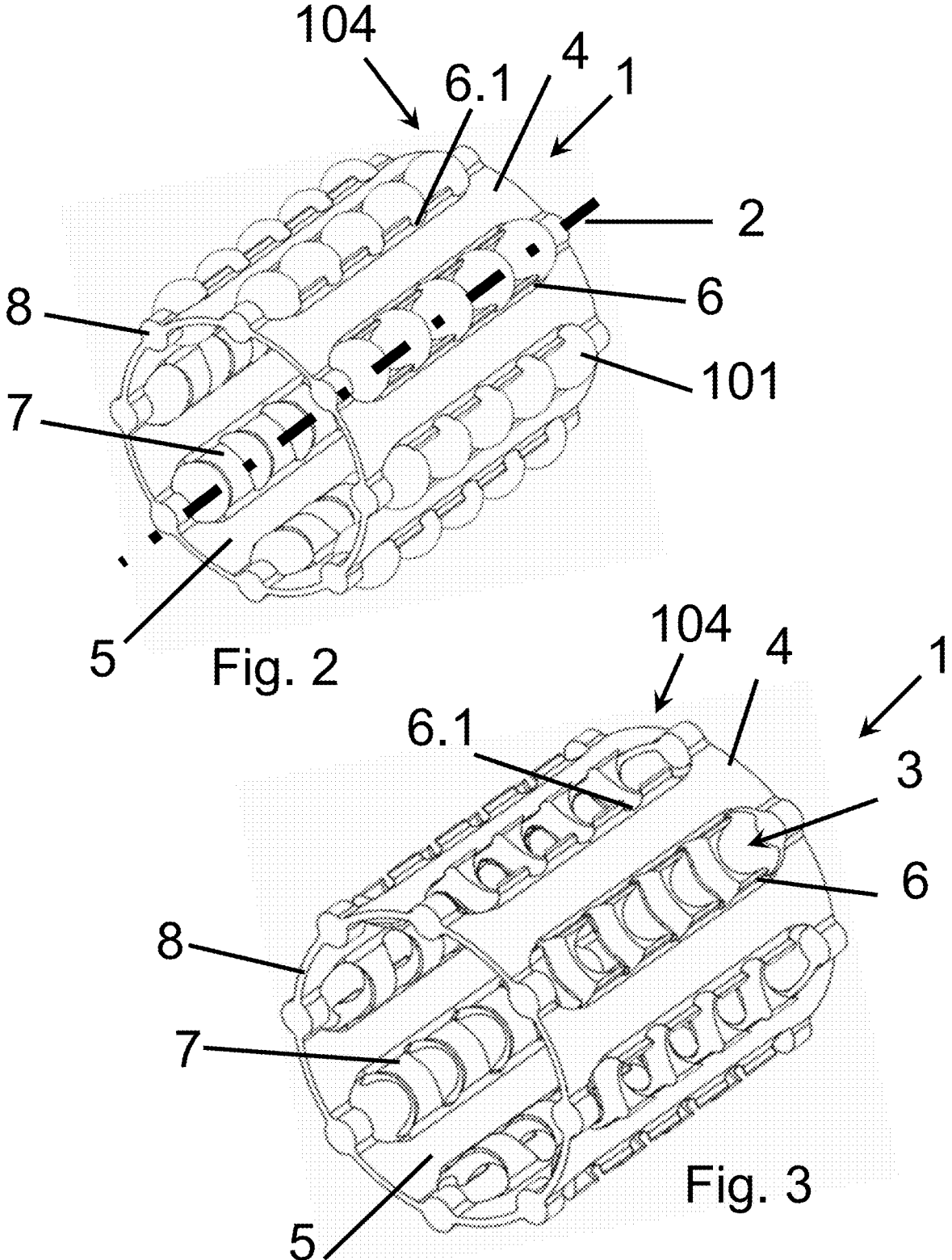
FIG. 2 is a perspective view of a rolling element cage with rolling elements, according to an exemplary embodiment.
FIG. 3 is a perspective view of the rolling element cage of FIG. 2 without the rolling elements, according to an exemplary embodiment.

FIG. 2 shows the rolling element cage 1 with the rolling elements 101. Each rolling element 101 is configured to be received within an opening 3 as illustrated in FIG. 3 (e.g., window, aperture, recess, etc.). The opening 3 is a recess of the substantially circular and cylindrical rolling element cage 1. The rolling elements 101 are grouped into individual rows of spheres, shown as rows 104, each of which extends along the longitudinal axis 2. The rolling element cage 1 includes a plurality of rows 104 circumferentially spaced from each other about the circumference of the rolling element cage 1. In some embodiments, the rolling element cage 1 includes more or fewer rows 104 than shown.

The rolling element cage 1 includes an outer surface 4 (e.g., a radially outward facing surface) including a plurality of radially outwardly protruding fixation structures/supports, shown as guide structures 6. The guide structures 6 are configured to hold (e.g., support) the rolling elements 101 in their respective positions and permit rotation of each rolling element 101. The guide structures 6 extend along the longitudinal axis 2 and laterally flank the openings 3 (and the rolling elements 101 received within the openings 3). By way of example, the guide structures 6 are positioned along one or more sides of (e.g., positioned along opposing lateral sides of, etc.) two adjacent openings 3 in the rows 104. The guide structures 6 are configured to support the rolling elements 101 on lateral sides (e.g., circumferential sides) thereof (e.g., as opposed to axial sides thereof) to limit axial movement (e.g., movement along the longitudinal axis 2) of the rolling elements 101 (e.g., substantially fix an axial position of the rolling elements 101). This lateral positioning and support provided by the guide structures 6 facilitates the openings 3 to be positioned as close to each other as desired, such that the rolling elements 101 can contact each other.

The guide structures 6 are spaced to form a gap 6.1 (e.g., recess) between two adjacent guide structures 6. The gap 6.1 formed between the guide structures 6 may be at the height of a corresponding opening 3 (e.g., at a substantially similar radial distance relative to the opening 3). In this manner, two adjacent openings 3 in each row 104 are flanked by a guide structure 6, and the gap 6.1 between the adjacent guide structures 6 is located along the longitudinal axis 2 at the level of a corresponding opening 3. The gaps 6.1 are located at the radial level (e.g., the radial distance from the longitudinal axis 2) of the openings 3 of the rolling element cage 1 or at the radial level of the area in which the center of the rolling element 101 is located (e.g., when the rolling element 101 is received within the opening 3). In some embodiments, the gap 6.1 is at the radial level of the middle of the opening 3 (e.g., the area where the rolling element 101 is positioned when received within the opening 3).

The rolling element cage 1 includes an inner surface 5 (e.g., a radially inward facing surface) including a plurality of radially inwardly protruding fixation structures (e.g., supports, counter structures, etc.), shown as support structures 7. The support structures 7 are positioned along the longitudinal axis 2 and axially between two openings 3 (and rolling elements 101) adjacent to each other in the row 104.

FIG. 3 shows that openings 3 merge into each other in the row 104, since there is no material from the rolling element cage 1 therebetween in the axial direction. The guide structures 6 form radial elevations along the outer surface 4, between which the gaps 6.1 are located. The support structures 7 along the inner surface 5 provide the support to the rolling elements 101 below the rotating plane of the rolling elements 101.

Figure 4:
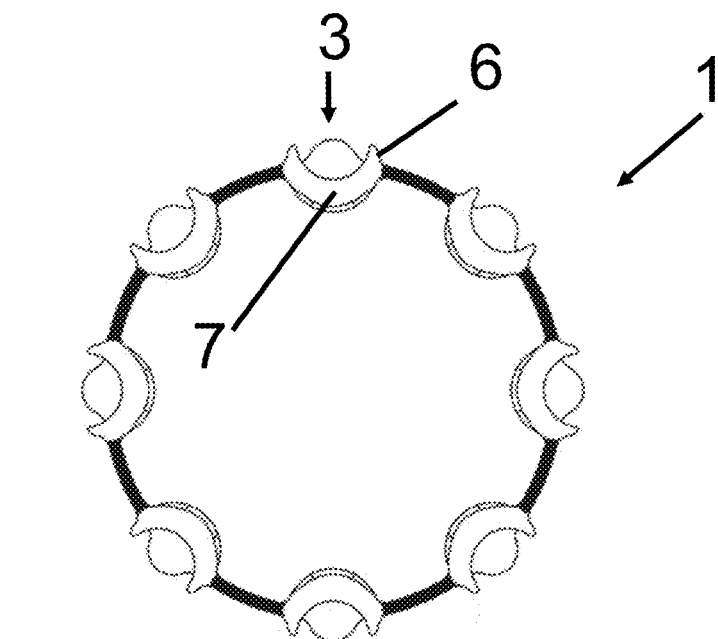
FIG. 4 is a cross-sectional front view of the rolling element cage of FIG. 3, according to an exemplary embodiment.

Referring to FIG. 4, a cross-section of the rolling element cage 1 is shown. The opening 3 is framed on the sides thereof by the guide structures 6 and the support structures 7. The guide structures 6 laterally support the rolling elements 101 within the openings 3, and the support structures 7 support the rolling elements 101 from the interior cavity (e.g., a bottom portion of the rolling elements 101). In this manner, the rolling elements 101 received within the openings 3 are held in place by the guide structures 6 along the outer surface 4 of the rolling element cage 1 and by the support structure 7 along the inner surface 5 of the rolling element cage 1. By way of example, when the rolling elements 101 are received within the openings 3, they are supported such that (i) a first portion of the rolling elements 101 extends within the rolling element cage 1 (e.g., radially inward relative to the inner surface 5) and is supported by the support structure 7, and (ii) a second portion of the rolling elements 101 extends exterior to the rolling element cage 1 (e.g., radially outward relative to the outer surface 4) and is supported by the guide structure 6. In such an embodiment, the guide structures 6 and the support structures 7 do not prevent the rolling elements 101 received within the openings 3 from contacting each other (e.g., if the openings 3 are positioned sufficiently close together).

When the pin 103 and the sleeve 102 are translated relative to together to a first state (e.g., pushed/compressed together to a compressed state), a force (e.g., an axial force) between the sleeve 102 and the pin 103 is transmitted therebetween by the rolling elements 101. The internal raceways 112 and the external raceways 113 are structured such that the force is not transferred via the body of the rolling element cage 1.

Figure 5:
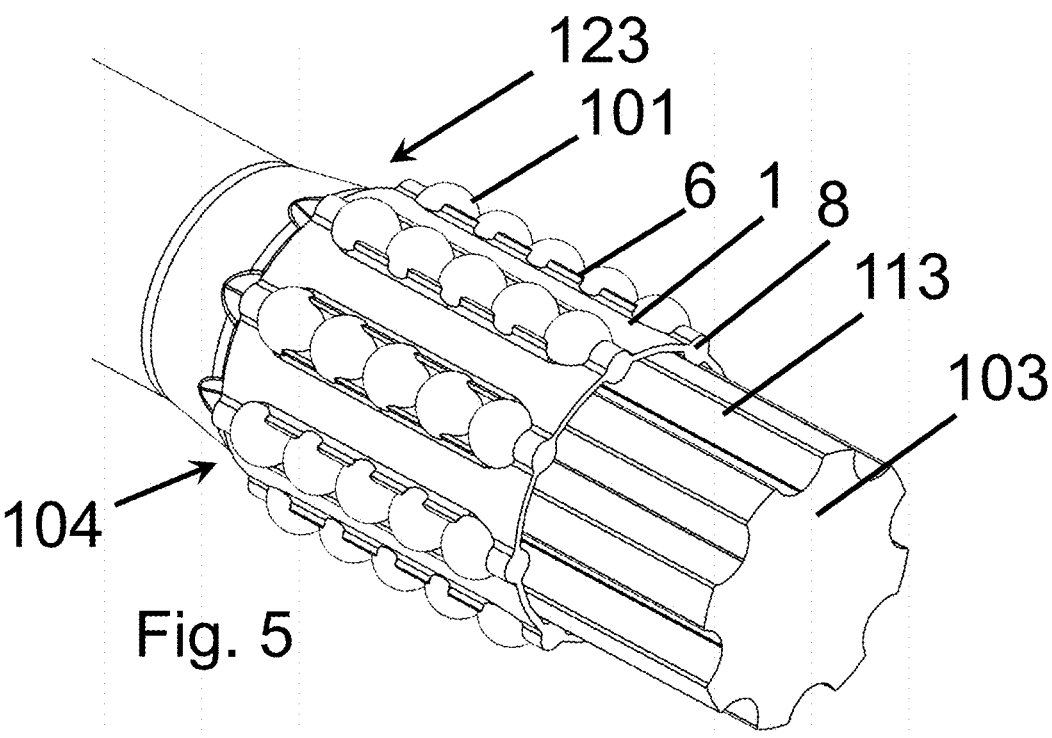
FIG. 5 is a perspective view of the end of the profile journal with the rolling element cage with balls, according to an exemplary embodiment.
Figure 7:
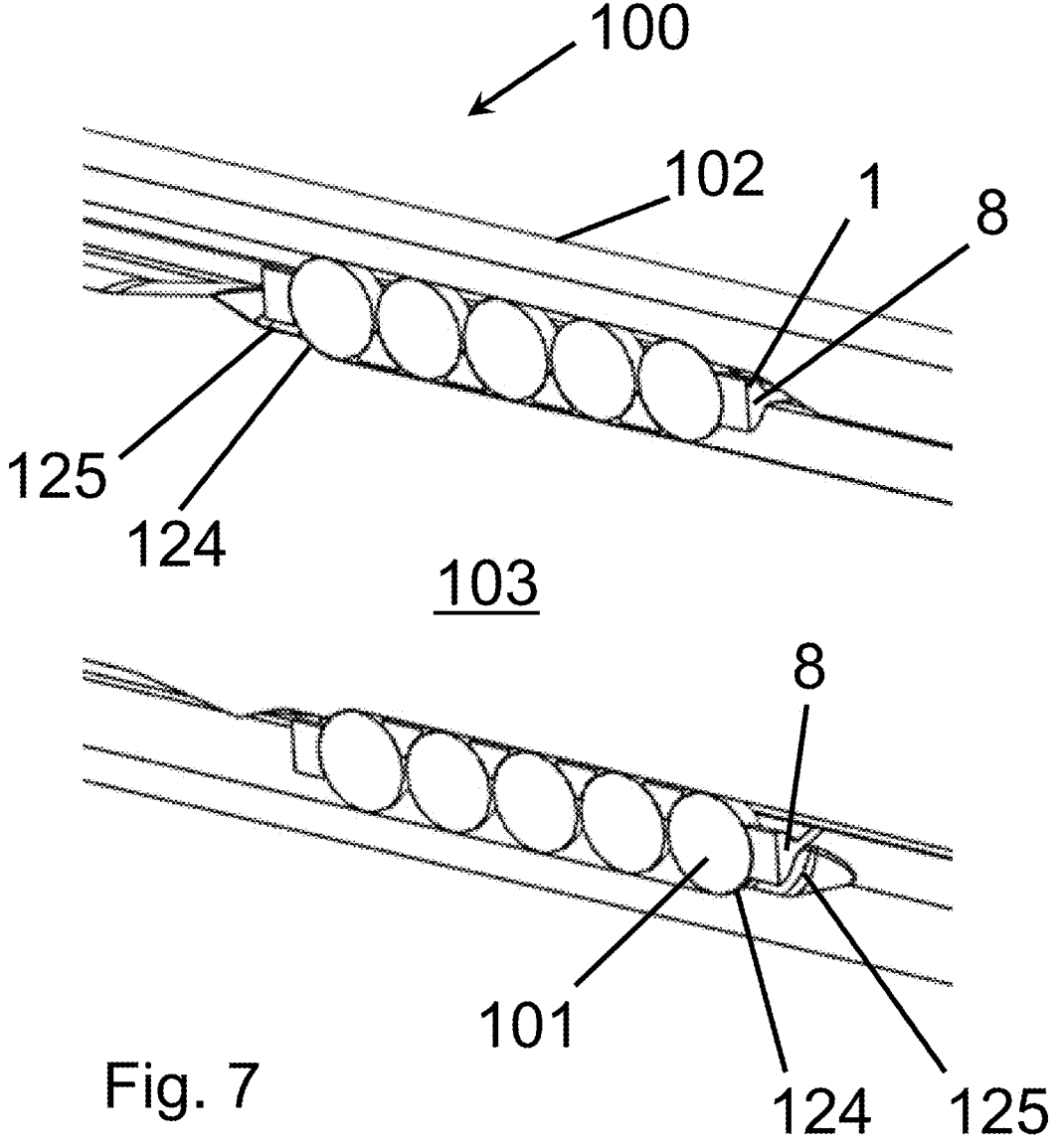
FIG. 7 is a longitudinal section through a displacement unit, according to an exemplary embodiment.

FIG. 5 shows the rolling element cage 1 with the rolling elements 101 positioned along (e.g., received on) the pin 103 near an end area 123 thereof. The end area 123 is an area where the internal raceways 112 and the external raceways 113 of the sleeve 102 and the pin 103, respectively, termi-nate. As shown in FIG. 5, the rolling elements 101 are positioned within the external raceways 113 of the pin 103. As shown in FIG. 7, the rolling elements 101 are positioned within the external raceways 113 of the pin 103 and the internal raceways 112 of the sleeve. The external raceways 113 and the internal raceways 112 are cooperatively ori-ented/positioned to receive the rolling elements 101 such that rolling element cage 1 is disposed between the sleeve 102 and the pin 103.

Figure 6:
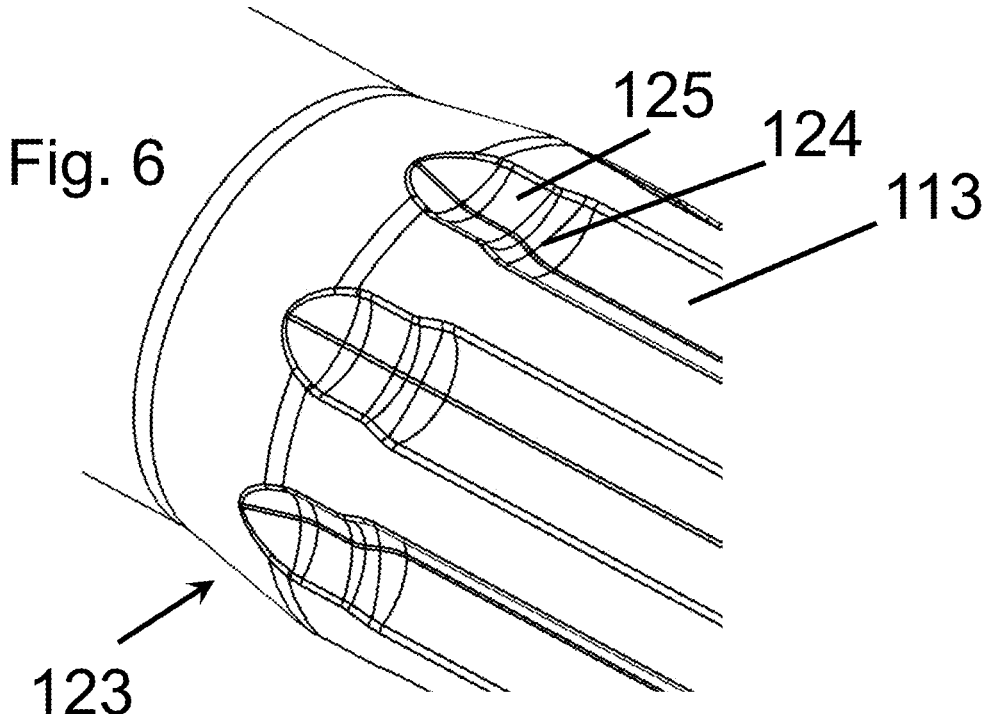
FIG. 6 is an enlarged representation of the end area of the raceways of the profile pin in FIG. 5, according to an exemplary embodiment.

Referring to FIG. 6, the end area 123 is shown enlarged. The end area 123 of the internal raceways 112 of the sleeve 102 and the end area 123 of the external raceways 113 of the pin 103 include a ramp 124 (e.g., a shoulder, a transition portion, etc.) and a plateau 125 (e.g., a flat portion, a laterally extending portion, etc.) adjacent to the ramp 124. The ramp 124 defines a slope (e.g., a gradient) greater than 0° and the remaining portions of the internal raceways 112 and the external raceways 113 (e.g., the plateaus 125) define a slope (e.g., a gradient) that is substantially 0°. The plateau 125, in the case of the pin 103, defines a larger radius (e.g., radially farther from the longitudinal axis 2) compared to that of the other sections of the external raceways 113. In the case of the sleeve 102, the plateau 125 defines a smaller radius (e.g., radially closer to the longitudinal axis 2) compared to that of the other sections of the internal raceways 112. In such an embodiment, the end faces 8 of the rolling element cage 1 are positioned radially outward relative to the plateau 125 of the pin 103 and/or radially inward relative to the plateau 125 of the sleeve 102.

Referring to FIG. 7, a cross-section of the displacement unit 100 is shown. As shown, the outermost rolling elements 101 of the rolling element cage 1 (the right-most rolling elements 101 as viewed from FIG. 7) are configured to engage with the ramp 124, and thus, also with the sleeve 102 and the pin 103. In some embodiments, the ramps 124 and the plateaus 125 extend about the entirety of the outer circum-ference of the pin 103 and the inner circumference of the sleeve 102. In some embodiments, the slope of the ramp 124 is constant. In such embodiments, the slope of the ramp 124 is dimensioned depending on the diameter of the rolling elements 101 used. In other embodiments, the ramp 124 is formed by a step with a rounded edge, which can come into contact with rolling elements 101 and thus form a stop therefore. The dimensioning of the plateau 125 depends on the radial distance between the pin 103 and the sleeve 102.

The plateau 125 may extend in an axial direction such that, when the sleeve 102 and the pin 103 are in the first, compressed state, the end face 8 of the rolling element cage 1 (e.g., a section of the rolling element cage 1 following the end opening 3) facing the end area 123 does not (e.g., is free of) contact the sleeve 102 and/or the pin 103. In other words, the end areas 123 of the raceways are shaped to limit movement of the rolling elements 101 relative thereto and to prevent contact between (i) the end face 8 of the rolling element cage 1 and (ii) (a) the sleeve 102 or (b) the pin 103. The end areas 123 include the ramp 124 with which the outermost rolling element 101 (e.g., the rolling elements 101 closest to the end face 8 of the rolling element cage 1, the rolling elements 101 with only one adjacent rolling element 101, etc.) is configured to contact to limit axial movement of the sleeve 102 and the pin 103 relative to each other. To prevent the rolling element cage 1 from contacting the sleeve 102 or the pin 103, the ramp 124 is followed by plateau 125. Accordingly, the ramp 124 is shaped such that the outermost rolling element 101 is configured to engage therewith. The plateau 125 is suitably shaped (e.g., an axial length and a radius (e.g., radial extension) thereof) such that the end face 8 of the rolling element cage 1 is configured to (i) be disposed between the sleeve 102 and the pin 103 and (ii) not engage with the sleeve 102 or the pin 103 when the outermost rolling element 101 is engaged with the ramp 124. Similarly, a radius and a length of the end face 8 of the rolling element cage 1 is suitably dimensioned to (i) be disposed between the sleeve 102 and the pin 103 and (ii) not engage with the sleeve 102 or the pin 103 when the outermost rolling element 101 is engaged with the ramp 124.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a descrip-tion of certain features described and claimed without restricting the scope of these features to the precise numeri-cal ranges provided. Accordingly, these terms should be interpreted as indicating that insubstantial or inconsequen-tial modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodi-ments (and such term is not intended to connote that such embodiments are necessarily extraordinary or superlative examples).

The terms "coupled," "connected," and the like, as used herein, mean the joining of two members directly or indi-rectly to one another. Such joining may be stationary (e.g., permanent, etc.) or moveable (e.g., removable, releasable, etc.). Such joining may be achieved with the two members, or the two members and any additional intermediate mem-bers being integrally formed as a single unitary body with one another or with the two members or the two members and any additional intermediate members being attached to one another.

References herein to the positions of elements (e.g., "top," "bottom," "above," etc.) are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present disclosures. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A displacement unit for a vehicle, the displacement unit comprising, a pin including a plurality of external raceways;

a sleeve including a plurality of internal raceways, the sleeve configured to receive at least a portion of the pin;

a plurality of rolling elements; and a rolling element cage including a plurality of openings configured to each accommodate a rolling element of the plurality of rolling elements, wherein the rolling element cage is configured to be received around the pin and disposed radially between the pin and the sleeve, wherein the rolling element cage includes a longitudinal axis and the plurality of openings are arranged in a row along the longitudinal axis and configured such that adjacent rolling elements of the plurality of rolling elements directly contact each other axially to transmit axial forces between the pin and the sleeve, and wherein the plurality of rolling elements are configured to be received at least partially within (i) the plurality of external raceways of the pin and (ii) the plurality of internal raceways of the sleeve.

2. The displacement unit of claim 1, wherein the rolling element cage includes a guide structure, and wherein the guide structure is positioned along an outer surface of the rolling element cage and laterally flanks two adjacent openings in the row.

3. The displacement unit of claim 2, wherein the rolling element cage includes a support structure, and wherein the support structure is positioned along (i) an inner surface of the rolling element cage and (ii) along the longitudinal axis between two openings of the plurality of openings adjacent to each other in the row.

4. The displacement unit of claim 3, wherein the rolling element cage includes a plurality of guide structures, wherein two adjacent guide structures of the plurality of guide structures are positioned to laterally flank each of the two openings adjacent to each other in the row, and wherein a gap is formed (i) between the two adjacent guide structures and (ii) at a radial level of the plurality of openings.

5. The displacement unit of claim 4, wherein the plurality of guide structures are positioned along opposing lateral sides of the plurality of openings.

6. The displacement unit of claim 5, wherein the rolling element cage includes a plurality of rows circumferentially spaced about a circumference of the rolling element cage, and wherein the plurality of guide structures are positioned along each row of the plurality of rows.

7. The displacement unit of claim 6, wherein the rolling element cage and the plurality of rolling elements slidably couple the pin with the sleeve such that the displacement unit is compressible to a compressed state.

8. The displacement unit of claim 7, wherein the pin and the sleeve each include an end area where the plurality of external raceways and the plurality of internal raceways terminate, respectfully.

9. The displacement unit of claim 8, wherein the end area includes a ramp and a plateau.

10. The displacement unit of claim 9, wherein the ramp defines a slope such that an outermost rolling element of the plurality of rolling elements is configured to engage the ramp when the displacement unit is in the compressed state.

11. The displacement unit of claim 10, wherein the plateau provides a space for an end face of the rolling element cage, such that, when the displacement unit is in the compressed state, the end face of the rolling element cage does not contact the pin or the sleeve.

12. A rolling element cage for a displacement unit, the rolling element cage comprising:

a plurality of openings configured to each accommodate a rolling element of a plurality of rolling elements;

a longitudinal axis; and a guide structure, wherein the plurality of openings are arranged in a row along the longitudinal axis and configured such that adjacent rolling elements of the plurality of rolling elements directly contact each other axially to transmit axial forces between the pin and the sleeve, and wherein the guide structure is positioned along an outer surface of the rolling element cage and laterally flanks two adjacent openings in the row.

13. The displacement unit of claim 12, wherein the rolling element cage includes a support structure, and wherein the support structure is positioned along (i) an inner surface of the rolling element cage and (ii) along the longitudinal axis between two openings of the plurality of openings adjacent to each other in the row.

14. The displacement unit of claim 13, wherein the rolling element cage includes a plurality of guide structures, wherein two adjacent guide structures of the plurality of guide structures are positioned to laterally flank each of the two openings adjacent to each other in the row, and wherein a gap is formed (i) between the two adjacent guide structures and (ii) at a radial level of the plurality of openings.

15. The displacement unit of claim 14, wherein the plurality of guide structures are positioned along opposing lateral sides of the plurality of openings.

16. The displacement unit of claim 15, wherein the rolling element cage includes a plurality of rows circumferentially spaced about a circumference of the rolling element cage, and wherein the plurality of guide structures are positioned along each row of the plurality of rows.

17. A displacement unit for a vehicle, the displacement unit comprising, a pin including a plurality of external raceways;

a sleeve including a plurality of internal raceways, the sleeve configured to receive at least a portion of the pin;

a plurality of rolling elements; and a rolling element cage including a plurality of openings configured to each accommodate a rolling element of the plurality of rolling elements, wherein the rolling element cage is configured to be received around the pin and disposed radially between the pin and the sleeve, wherein the plurality of rolling elements are configured to be received at least partially within (i) the plurality of external raceways of the pin and (ii) the plurality of internal raceways of the sleeve, wherein the pin and the sleeve each include an end area where the plurality of external raceways and the plurality of internal raceways terminate, respectfully, the end area including a ramp and a plateau, wherein an outermost rolling element of the plurality of rolling elements is configured to engage the ramp when the displacement unit is in a compressed state, and wherein the plateau provides a space for an end face of the rolling element cage, such that, when the displacement unit is in the compressed state, the end face of the rolling element cage does not contact the pin or the sleeve and an axial force is transferred between the pin and the sleeve via the plurality of rolling elements.

18. The displacement unit of claim 17, wherein the rolling element cage includes a longitudinal axis, and wherein the plurality of openings are arranged in a row along the longitudinal axis.

19. The displacement unit of claim 17, wherein the ramp defines a slope such that an outermost rolling element of the plurality of rolling elements is configured to engage the ramp when the displacement unit is in the compressed state.

20. The displacement unit of claim 17, wherein the plurality of openings are arranged in a row along a longitudinal axis and configured such that adjacent rolling elements of the plurality of rolling elements directly contact each other axially to transmit axial forces between the pin and the sleeve.

* * * * *